United States Patent [19]

Campbell

[11] Patent Number: 4,881,783

[45] Date of Patent: Nov. 21, 1989

[54] WHEEL LINER ASSEMBLY

[76] Inventor: Joe B. Campbell, 4724 Driver Ct., Virginia Beach, Va. 23462

[21] Appl. No.: 209,726

[22] Filed: Jun. 22, 1988

[51] Int. Cl.$^4$ ............................................. B60B 7/06
[52] U.S. Cl. ................................ 301/37 S; 301/108 S
[58] Field of Search ................. 301/37 R, 37 S, 37 P, 301/108 R, 108 S, 37 TP, 37 PB

[56] References Cited

U.S. PATENT DOCUMENTS

| | | | |
|---|---|---|---|
| 2,432,531 | 12/1947 | Lyon | 301/37 |
| 2,460,784 | 2/1949 | Lyon | 301/37 |
| 2,537,072 | 1/1951 | Lyon | 301/37 S |
| 2,541,079 | 2/1951 | Lyon | 301/37 S |
| 2,652,286 | 9/1953 | Lyon | 301/37 S |
| 2,869,929 | 1/1959 | Hurd | 301/37 |
| 3,561,820 | 2/1971 | Chaivre | 301/37 S X |
| 4,240,670 | 12/1980 | Zorn et al. | 301/108 S X |
| 4,306,751 | 12/1981 | Wegner | 301/37 AT |
| 4,606,582 | 8/1986 | Warren | 301/37 S |
| 4,632,465 | 12/1986 | Cummings | 301/108 S |
| 4,787,681 | 11/1988 | Wang et al. | 301/37 S |

FOREIGN PATENT DOCUMENTS 541032  5/1957  Canada .............................. 301/37 S Primary Examiner—Russell D. Stormer
Attorney, Agent, or Firm—Griffin, Branigan & Butler

[57] ABSTRACT

A wheel liner assembly (10) comprises an annularly-shaped cover member (12) defining a hole (18) which is larger than a cluster of threaded studs (22) on a wheel hub (24) and a circularly-shaped cap member (14) having a plurality of stud holes (50 and 52); the annularly-shaped cover member and the circular-shaped cap member having indentations (48) and protrusions (42) so that they can be snapped together. The cap member has an outer perimeter diameter that is larger than a diameter of the hole in the annularly-shaped cover member so that when the liner is mounted on the wheel hub by lug nuts (54) engaging the threaded studs it impinges on the annularly-shaped cover member and thereby clamps the annularly-shaped cover member to a load-bearing portion (28) of a vehicle wheel (30). Some of the stud holes in the cap member are larger than the lug nuts so that not all of the lug nuts must be removed to mount the liner assembly.

8 Claims, 3 Drawing Sheets

WHEEL LINER ASSEMBLY

BACKGROUND OF THE INVENTION

This invention relates to the art of ornamental liners which are mounted on vehicle wheels outside load-bearing portions of the wheels to make the wheels more pleasing in appearance.

Wheel liners have long been used for covering unsightly load-bearing portions of vehicle wheels. Many of these wheel liners are fastened directly to the load-bearing portions of the wheels, however, some of them are clamped onto the load-bearing portions of the wheels by means of the same lug nuts which fasten the vehicle wheels to wheel hubs.

A problem with some lug-nut mounted wheel liners is that in order to mount them it is necessary to jack-up a vehicle, or otherwise support the vehicle, to allow removal of the lug nuts. It is an object of this invention to allow a lug-nut mounted liner to be mounted on a wheel hub without requiring the vehicle to be jacked-up or otherwise supported.

Another problem with some lug-nut mounted wheel liners is that the positions of holes for air-valve stems, which have been placed in the liners to correspond with positions of air-valve stems for the wheels they are covering cannot be easily adjusted. Although the positions of these stems on wheels are usually standardized, some of the stems are not in their standard positions. When the wheel liners do not allow adjustment of the positions of the air-stem holes to lug holes it has not always been possible to mount those liners on wheels whose air-valve stems are not in their standard positions. It is an object of this invention to provide a lug-nut mounted wheel liner having an air-stem hole whose position can be adjusted relative to lug holes therein.

Yet another difficulty with many prior-art wheel liners is that they comprise a plurality of pieces which are clamped together by lug nuts. That is, these pieces must be held together until they are clamped together by the lug nuts. Mounting such multiple-piece liners is difficult for one person who must hold the various parts together, maintain a wheel on the studs and engage lug nuts with the studs, all at the same time. Thus, it is an object of this invention to provide a wheel liner which can be moved as one piece for the mounting thereof.

A further object of this invention is to provide a wheel liner which not only is convenient and easy to mount, but which is quite secure when mounted is highly durable, and is self centering.

Further, it is an object of this invention to provide a wheel liner which is relatively inexpensive to manufacture.

SUMMARY

According to principles of this invention, a wheel liner is comprised mainly of two pieces, an annularly-shaped cover member and a circular-shaped cap member, which can be snapped together to be moved as one piece for the mounting thereof. The cap member has an outer perimeter diameter which is larger than a diameter of a hole in the annularly-shaped cover member so that when the annularly-shaped cover member is placed on a wheel hub and the cap member is clamped to the hub by lug nuts, it impinges on the annularly-shaped cover member and, in turn, clamps the annularly-shaped cover member to a load-bearing portion of a vehicle wheel. Some of the stud holes in the cap member are large enough that lug nuts can pass therethrough, but at least two of the stud holes are not large enough for the lug nuts to pass therethrough. Thus, only some of the lug nuts must be removed for mounting the wheel liner and the vehicle need not be jacked-up or otherwise supported. Lug-nut covers are included to cover all lug nuts as well as those stud holes which the lug nuts will pass through. In a preferred embodiment, a radially outward indentation is included on an axially directed circular wall of the cap member and radially outward protrusions are included on an axially directed circular wall of the annularly-shaped cover member for engaging one another so that these members can be snapped together.

BRIEF DESCRIPTION OF THE DRAWINGS

The foregoing and other objects, features and advantages of the invention will be apparent from the following more particular description of a preferred embodiment of the invention, as illustrated in the accompanying drawings in which reference characters refer to the same parts throughout the different views. The drawings are not necessarily to scale, emphasis instead being placed upon illustrating principles of the invention in a clear manner.

DESCRIPTION OF PREFERRED EMBODIMENT

Figure 1:
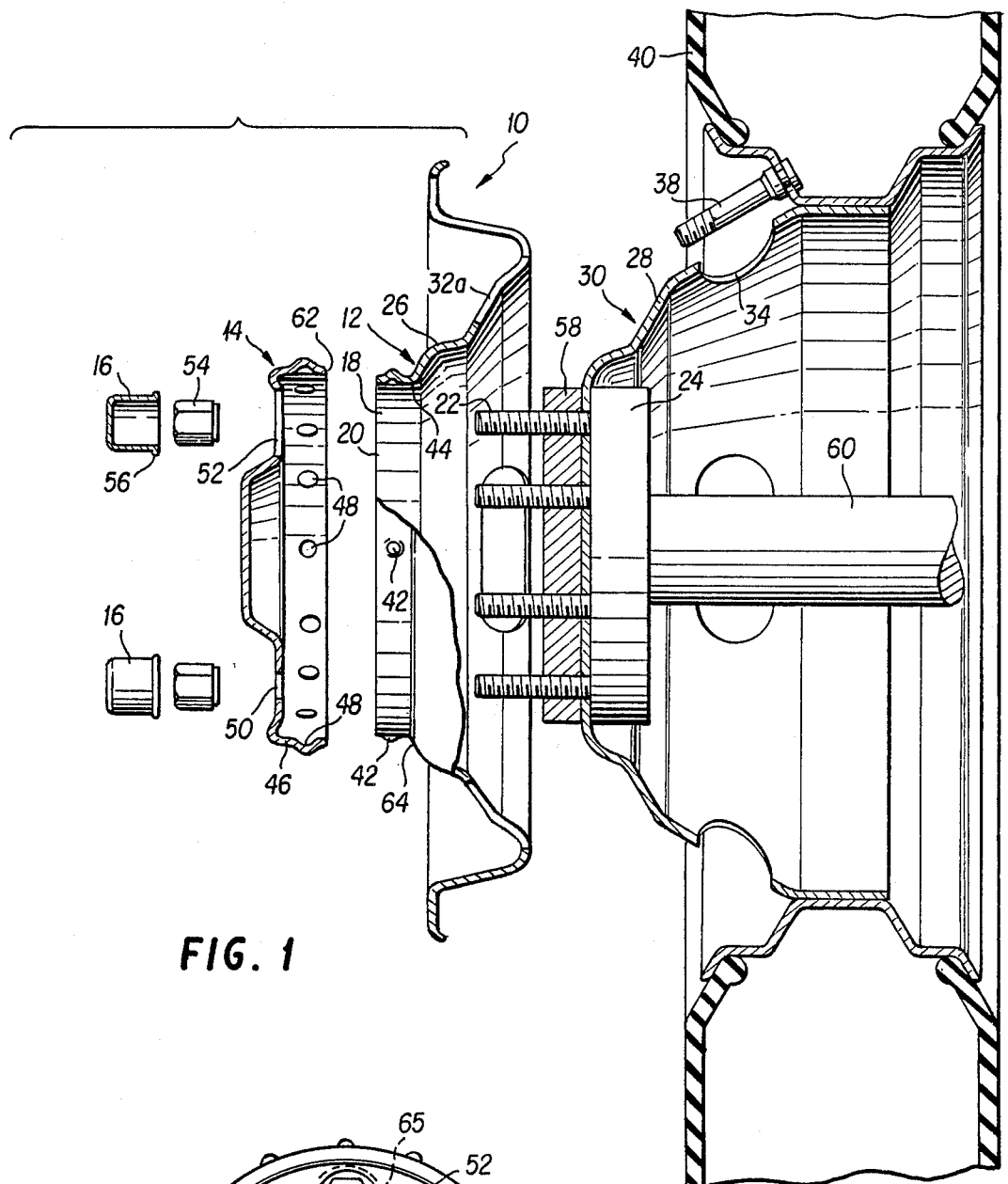
FIG. 1 is a segmented, sectional, exploded, view of basic elements of a wheel liner of this invention, portions of a vehicle wheel hub and a vehicle wheel with a tire mounted thereon.

Referring now to the drawings, a wheel liner assembly 10 comprises an annularly-shaped cover member 12, a circular-shaped cap member 14, and lug nut covers 16.

The annularly-shaped cover member 12 defines a hole 18 in the center thereof which is bounded by an axially-directed circular wall 20 which is sufficiently large to completely encircle a cluster of threaded studs 22 mounted on a circular wheel hub 24. The annularly-shaped cover member 12 includes a flange portion 26 which extends radially outwardly from the circular wall 20 to cover a load-bearing portion 28 of a wheel 30. The flange portion 26 includes hand holes 32 therein which correspond to hand holes 34 in the load bearing portion 28 of the wheel 30. One of the hand holes 32a has an extra slot 36 for allowing an air-valve stem 38 of a tire 40 mounted on the wheel 30 to pass therethrough.

The circular wall 20 includes at least four radially outwardly directed protrusions 42 spaced thereabout. In a preferred embodiment, although the circular wall 20 is sufficiently large to allow all threaded studs 22 in a circular cluster to pass through the hole 18, it is smaller than a circumference of the wheel hub 24, thus, an inner end 44 impinges on the load-bearing portion 28 at the hub 24 when the annularly-shaped cover member 12 is mounted thereon.

Figure 2:
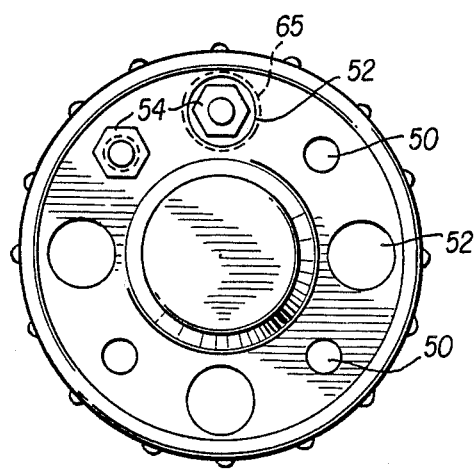
FIG. 2 is a plan side view of a cap member of the wheel liner of FIG. 1, as seen from the left side in FIG. 1, with two lug nuts being shown thereon.
Figure 1A:
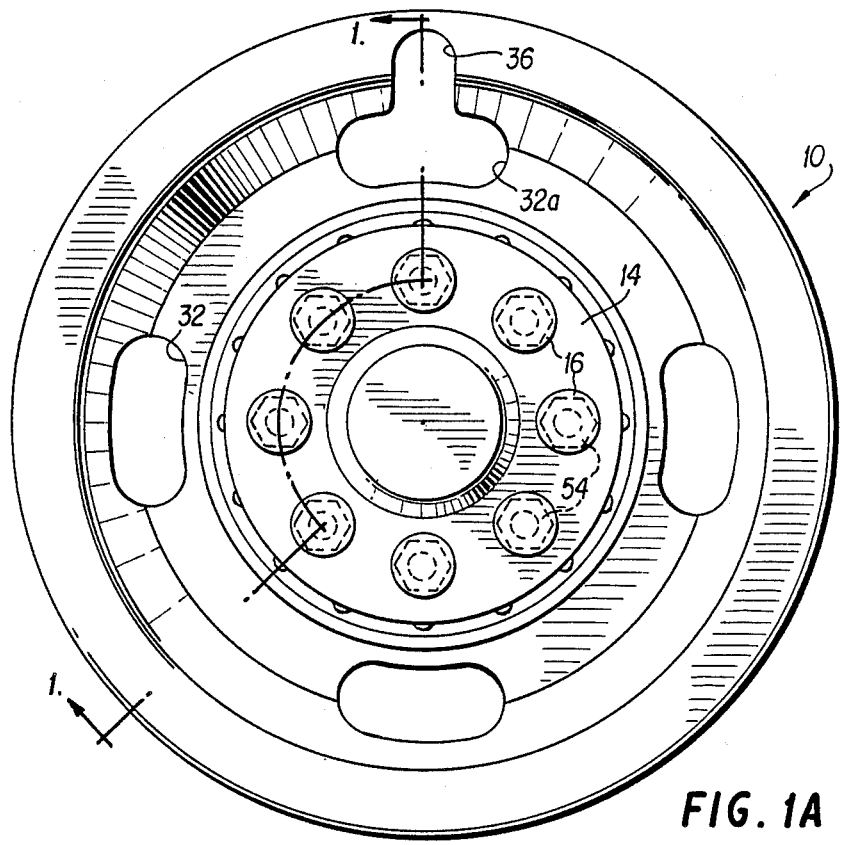
FIG. 1A is a plan side view of a mounted wheel liner of this invention as seen from the left side in FIG. 1.
Figure 3:
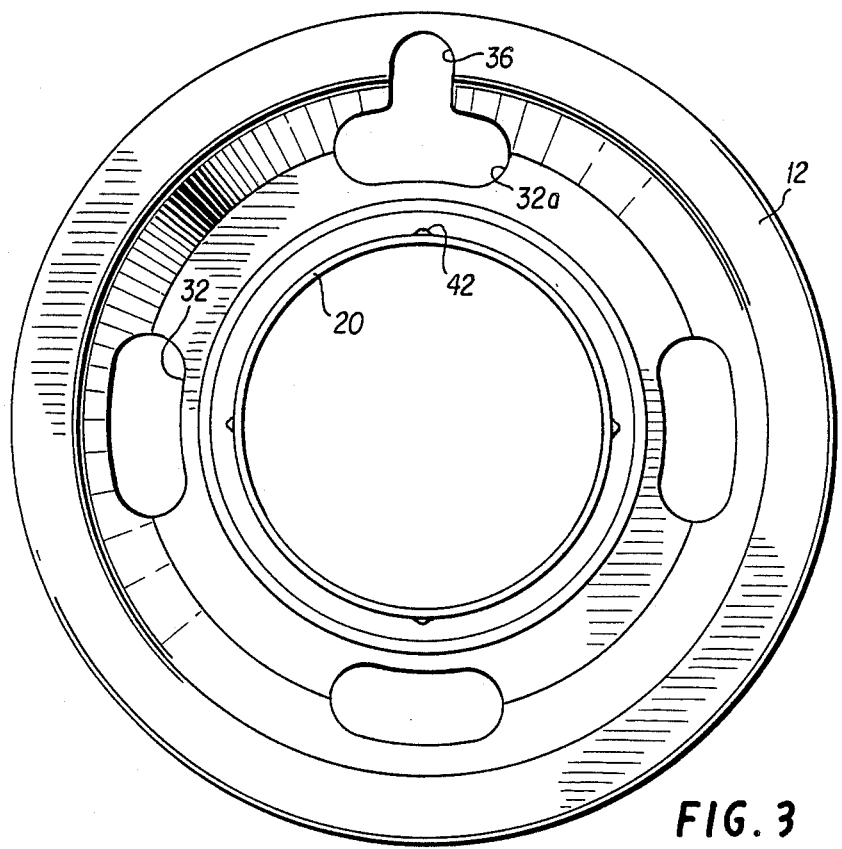
FIG. 3 is a plan side view of an annularly-shaped cover member of the wheel-liner assembly of FIG. 1 as seen from the left side in FIG. 1.

The cap 14 also has a circular-shaped axially-directed wall 46 which has a diameter slightly larger than the diameter of the circular wall 20 of the annularly-shaped cover member 12. The cap circular wall 46 includes a ring of indentations 48 on an inner surface thereof which, snap together with the protrusions 42 when the circular wall 20 is telescoped into the circular wall 46. When these two members are snapped together, the annularly-shaped cover member 12 and the cap member 14 can be moved together as one unit. The cap member 14 has stud holes 50 and 52 therein whose positions correspond to the positions of the threaded studs 22. On most trucks, there are eight studs 22 and therefore eight stud holes 50 and 52. Stud holes 50 are ⅞ inch in diameter, which is slightly larger than the threaded studs 22 while stud holes 50 are 1⅛ inch in diameter, which is larger than lug nuts 54 which engage the threaded studs 22. As can be seen in FIG. 2, there are four large stud holes 52 and four small stud holes 50.

The lug-nut covers 16 have diameters at bases 56 thereof which are sufficiently great to cover the enlarged stud holes 52. These lug-nut covers 16 are resilient and are friction held onto outer surfaces of the lug nuts 54.

Figure 4:
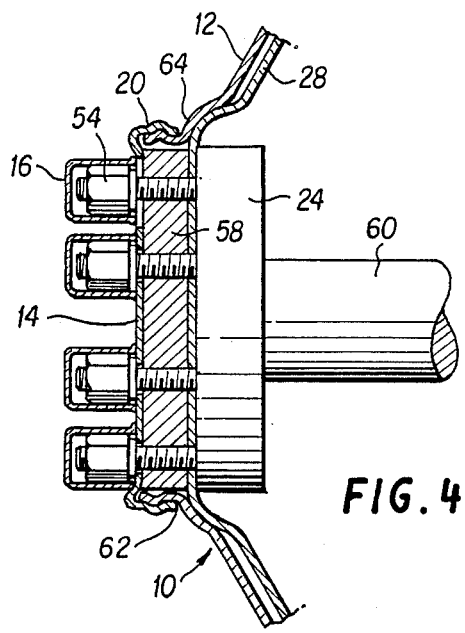
FIG. 4 is a sectional view taken approximately at a position indicated by line 1—1 in FIG 1A on an annularly-shaped member, showing the wheel liner of FIG. 1 mounted on the hub of FIG. 1.

Describing operation of the wheel-liner assembly shown in FIGS. 1-4, this wheel-liner assembly is shown mounted on a General Motors type truck which includes a retaining ring 58 having holes therein for receiving the threaded studs 22 for clamping the load-bearing portion 28 of the wheel 30 to the hub 24. The purpose and use of the retaining ring is fully set forth in U.S. Pat. No. 4,606,582 to Warren. The hub 24 is mounted on an axle 60 for rotation about an axis to thereby allow rotation about this axis of the tire 40. In the FIG. 1 embodiment, the circular wall 20 is sufficiently large that it surrounds an outer perimeter of the retaining ring 58, as can be seen in FIG. 4.

In order to mount the wheel liner assembly 10 to the hub 24, it is not necessary to otherwise support the vehicle. In this respect, only four lug nuts 54 must be removed from the threaded studs 22. Every other lug nut 54 can be left on its stud. Once the four lug nuts are removed, the annularly-shaped cover member 12 is held on the wheel 30 to a position with hand hole 32a at the air-valve stem 38 and the cap member 14 being simultaneously positioned so that its large stud holes 52 correspond to those lug nuts 54 which have been left on the threaded studs 22. The cap member 14 and the annularly-shaped cover member 12 are then snapped together by telescoping the circular wall 20 of the annularly-shaped cover member 12 into the circular wall 46 of the cap member 14 until the protrusions 42 engage with some of the ring indentation 48. Thereafter, the wheel-liner assembly 10 can be moved as one unit and it is placed on the outer surface of the wheel 30 with the enlarged stud holes 52 aligned with the lug nuts left in placed and the smaller stud holes 50 having the threaded studs without lug nuts passing therethrough Thereafter, the lug nuts 54 are engaged with the threaded studs 22 not having lug nuts and these lug nuts are tightened down to clamp the cap member 14 against the retaining ring 58. Simultaneously, a circular edge 62 of the cap member 14 impinges on a ledge 64 of the annularly-shaped conveyor member 12 to clamp this member between it and the load-bearing portion 28 of the wheel 30.

There are sufficient number of the ring indentations 48 so that the position of the annularly-shaped cover member 12 can be rather finely adjusted relative to that of the cap member 14. Thus, the wheel-liner assembly 10 will fit on any relative position of the air-valve stem 38 and the threaded studs 22.

Once the lug nuts 54 have been tightened down, the lug-nut covers 12 are placed on all lug nuts, including those holding the cap member 14 down and those which were not removed. The lug-nut covers 16, as is illustrated by a dashed line 65 in FIG. 2, are sufficiently large to cover all stud holes 50 and 52 in the cap member 14 so that these different size stud holes can no longer be seen.

It will be appreciated that the wheel-liner assembly 10 of this invention can be mounted as one piece which makes the mounting thereof simpler than for some multi-part wheel liners. At the same time, however, by clamping the wheel liner onto the load-bearing portion 28, the wheel liner assembly 10 is held securely thereon to prevent relative motion between the annularly-shaped cover member 12 and the cap member 14. In this respect however, relative motion between the cap member 14 and the annularly-shaped cover member 12 does not easily occur in any case and when it is necessary to adjust these two members circumferentially relative to one another, it is usually necessary to "pop" them apart and then "snap" them together again.

Figure 5:
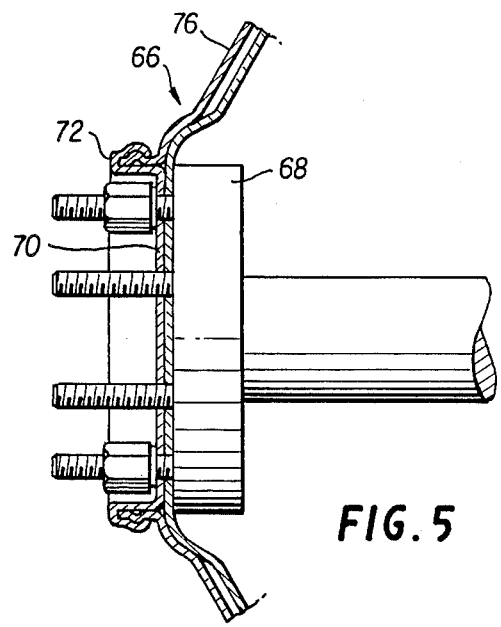
FIG. 5 is a view similar to FIG. 4 but of a different embodiment in which a mounting ring is not used as part of a wheel mounting assembly.

FIG. 5 depicts another embodiment of this invention that is used to mount a wheel liner assembly 66 onto a hub 68 when no retaining ring is used (usually for non GM vehicles). In this embodiment, a cap 70 must bend axially outwardly at 72 and then again inwardly to form a circular wall 74 similar to the circular wall 46 of the cap of the FIG. 1 embodiment. An annularly-shaped cover member 76 is substantially the same as the annularly-shaped cover member 12 of the FIG. 1 embodiment.

Figure 6:
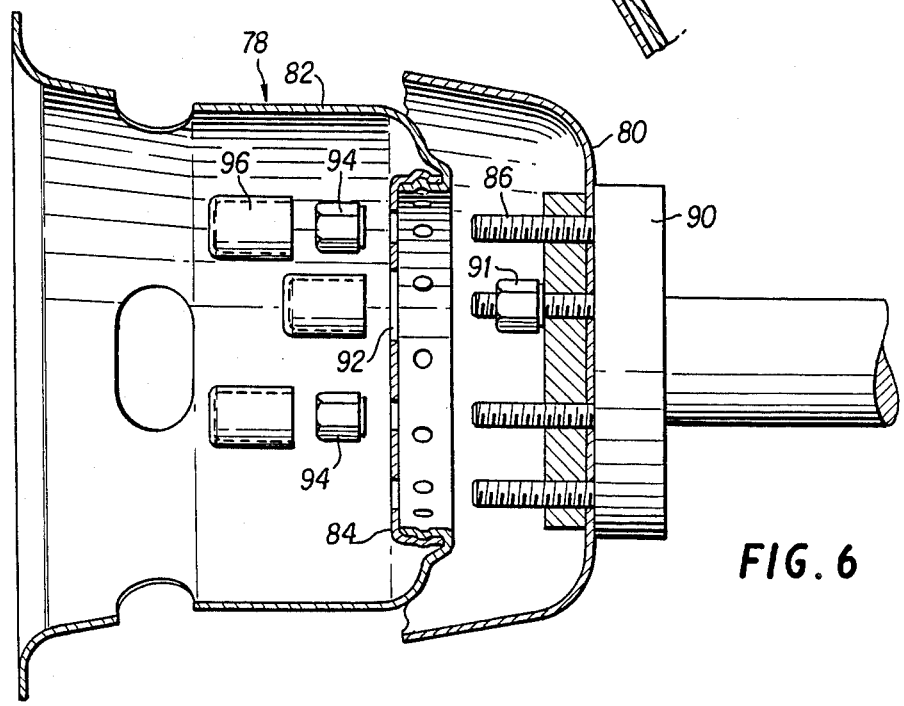
FIG. 6 is an exploded sectional view for a rear double wheel embodiment of this invention.

FIG. 6 depicts an embodiment in which a wheel liner assembly 78 is used to cover a load-bearing portion 80 of a rear wheel of a truck. FIG. 6 depicts an annularly-shaped cover member 82 snapped onto a cap member 84 about to be mounted on threaded studs 86 and a retaining ring 88 of a hub 90. A lug nut 91 need not be removed because it will pass through a larger stud hole 92 while lug nuts 94 must be removed. The lug nut covers 96 will be applied to the lug nuts 90 and 94 once the cap member 84 is clamped against the load-bearing portion 80 by means of the lug nuts 94.

While the invention has been particularly shown and described with reference to a preferred embodiment, it will be understood those skilled in the art that various changes in form and detail may be made therein without departing from the spirit and scope of the invention. For example, it would be possible to make the circular walls 20 and 46 to be non-circular, square for example. However, if this is done it will not be as easy to adjust positions of the stud holes 50 and 52 relative to the hand hole 32a.

The embodiments of the invention in which an exclusive property or privilege are claimed are defined as follows:

1. A wheel liner assembly of a type for being mounted on a circular, axially-directed, surface of a rotatable wheel hub having a plurality of threaded studs arranged in a cluster thereon on which a load-bearing portion of a vehicle wheel is clamped by lug nuts which mesh with said threaded studs, said wheel cover assembly comprising:

an annularly-shaped cover member defining a hole in the middle thereof, said hole being larger than said cluster of threaded studs, said annularly-shaped cover member extending radially outwardly for covering a load-bearing portion of a wheel;

a cap member having a plurality of stud holes therein corresponding to the positions of said studs for being placed on said studs and clamped to said load-bearing portion of said vehicle wheel by said lug nuts, said cap member having an outer perimeter diameter that is larger than a diameter of said hole in said annularly-shaped cover member whereby when said annularly-shaped cover member is placed on said wheel hub and said cap member is clamped to said hub by said lug nuts it impinges on said annularly-shaped cover member and, in turn, clamps said annularly-shaped cover member to said load-bearing portion of said vehicle wheel;

wherein, is further included on said cap member, at said outer perimeter thereof, and on said annularly-shaped cover member, at said hole thereof, interlocking engaging means for enabling these two members to be snapped together in various rotative orientations one to the other so that these two members can be snapped together and mounted on the hub as one piece.

2. A wheel liner assembly as in claim 1, wherein some of said stud holes are large enough for said lug nuts to pass therethrough, but at least two of said stud holes are not large enough for said lug nuts to pass therethrough.

3. A wheel liner assembly as in claim 2, wherein are further included lug-nut covers for covering said lug nuts, said lug-nut cover being sufficiently large to cover the larger stud holes.

4. A wheel liner assembly as in claim 1, wherein said annularly-shaped cover member and said cap member include overlapping axially-directed walls on which said engaging means are located for snapping together.

5. A wheel liner assembly as in claim 4, wherein said overlapping axially-directed walls are circular and wherein said cap axially-directed circular wall is radially outside said annularly-shaped cover circular wall.

6. A wheel liner assembly as in claim 5, wherein said engaging means are radially outward protrusions on said annularly-shaped cover member circular wall and an indentation ring on said cap member circular wall.

7. A wheel liner assembly as in claim 5, wherein said hole in the middle of said annularly-shaped cover member is smaller than said circular surface of the wheel hub.

8. A wheel liner assembly as in claim 1, wherein said hole in the middle of said annularly-shaped cover member is smaller than said circular surface of the wheel hub.

* * * * *